(12) United States Patent
Sung (10) Patent No.: US 11,009,186 B2
(45) Date of Patent: May 18, 2021

(54) TANK STATE-DETECTING BREATHING AIR CHARGER

(71) Applicant: MSL COMPRESSOR CO., LTD., Pocheon (KR)

(72) Inventor: Si Min Sung, Seoul (KR)

(73) Assignee: MSL COMPRESSOR CO., LTD., Pocheon (KR)

( * ) Notice: Subject to any disclaimer, the term of this patent is extended or adjusted under 35 U.S.C. 154(b) by 239 days.

(21) Appl. No.: 16/328,695

(22) PCT Filed: Aug. 10, 2017

(86) PCT No.: PCT/KR2017/008678
§ 371 (c)(1),
(2) Date: Feb. 26, 2019

(87) PCT Pub. No.: WO2018/038434
PCT Pub. Date: Mar. 1, 2018

(65) Prior Publication Data
US 2019/0203885 A1    Jul. 4, 2019

(30) Foreign Application Priority Data

Aug. 26, 2016 (KR) .......................... 10-2016-0108808

(51) Int. Cl.
*B01D 53/22* (2006.01)
*F17C 13/02* (2006.01)
(Continued)

(52) U.S. Cl.
CPC ................ *F17C 13/02* (2013.01); *A62B 7/02* (2013.01); *A62B 27/00* (2013.01);
(Continued)

(58) Field of Classification Search
CPC ........ B01D 46/0027; B01D 2259/4533; B01D 53/229; B01D 53/265; B01D 2257/102; B01D 2256/12; B01D 53/22; F04B 49/22; F04B 27/0531; F04B 37/18; F04B 25/00; F04B 39/16; F04B 35/01; F04B 27/053;
(Continued)

(56) References Cited

U.S. PATENT DOCUMENTS

2009/0145847 A1* 6/2009 Spiegelman ........... B01D 53/22
210/662
2010/0043527 A1* 2/2010 Marra ....................... B03C 3/08
73/28.02

(Continued)

FOREIGN PATENT DOCUMENTS

KR    1020060017039 A    2/2006
KR    1020070053728 A    5/2007
(Continued)

OTHER PUBLICATIONS

Search Report dated Dec. 5, 2017 for PCT Application No. PCT/KR2017/008678.

*Primary Examiner* — Anthony R Shumate (57) ABSTRACT

The present invention relates to a breathing air charger for detecting a tank state, capable of providing air properly adjusted in the concentration of oxygen and nitrogen to a breathing air tank used by a firefighter or a scuba diver, and of effectively discharging air from the breathing air tank.

8 Claims, 4 Drawing Sheets

(51) Int. Cl.
| | |
|---|---|
| *A62B 7/02* | (2006.01) |
| *F17C 5/06* | (2006.01) |
| *F17C 5/00* | (2006.01) |
| *F04B 49/22* | (2006.01) |
| *F04B 27/053* | (2006.01) |
| *F04B 39/16* | (2006.01) |
| *F04B 27/04* | (2006.01) |
| *A62B 27/00* | (2006.01) |
| *B01D 46/00* | (2006.01) |
| *B01D 53/26* | (2006.01) |
| *F04B 25/00* | (2006.01) |
| *F04B 37/18* | (2006.01) |
| *F17C 7/00* | (2006.01) |
| *F04B 35/01* | (2006.01) |
| *F04B 39/10* | (2006.01) |

(52) U.S. Cl.
CPC ......... *B01D 46/0027* (2013.01); *B01D 53/22* (2013.01); *B01D 53/229* (2013.01); *B01D 53/265* (2013.01); *F04B 25/00* (2013.01); *F04B 27/04* (2013.01); *F04B 27/053* (2013.01); *F04B 37/18* (2013.01); *F04B 39/16* (2013.01); *F04B 49/22* (2013.01); *F17C 5/00* (2013.01); *F17C 5/06* (2013.01); *F17C 7/00* (2013.01); *B01D 2256/12* (2013.01); *B01D 2257/102* (2013.01); *B01D 2259/4533* (2013.01); *F04B 27/0531* (2013.01); *F04B 35/01* (2013.01); *F04B 39/10* (2013.01); *F17C 2205/0323* (2013.01); *F17C 2205/0341* (2013.01); *F17C 2205/0352* (2013.01); *F17C 2221/031* (2013.01); *F17C 2227/0157* (2013.01); *F17C 2227/0337* (2013.01); *F17C 2250/036* (2013.01); *F17C 2250/043* (2013.01); *F17C 2250/0452* (2013.01); *F17C 2250/0636* (2013.01); *F17C 2265/015* (2013.01); *F17C 2270/025* (2013.01)

(58) Field of Classification Search
CPC .. F04B 27/04; F04B 39/10; F17C 5/00; F17C 2227/0157; F17C 2227/0337; F17C 5/06; F17C 13/02; F17C 2205/0352; F17C 2205/0323; F17C 7/00; F17C 2221/031; F17C 2205/0341; F17C 2250/036; F17C 2250/043; F17C 2250/0452; F17C 2250/0636; F17C 2265/015; F17C 2270/025; A62B 27/00; A62B 7/02
See application file for complete search history.

(56) References Cited

U.S. PATENT DOCUMENTS

| | | | |
|---|---|---|---|
| 2012/0234172 A1* | 9/2012 | Sugiyama | G01N 15/0656 96/26 |
| 2013/0233170 A1* | 9/2013 | Spiegelman | B01D 69/141 95/23 |
| 2017/0136270 A1* | 5/2017 | Son | B03C 3/60 |
| 2017/0246486 A1* | 8/2017 | Cazier | F24F 11/62 |
| 2018/0188218 A1* | 7/2018 | Sohn | G01R 13/0209 |
| 2018/0195738 A1* | 7/2018 | Park | F04D 29/701 |
| 2019/0056292 A1* | 2/2019 | Mou | G01N 1/10 |
| 2019/0060821 A1* | 2/2019 | Mou | G01N 33/0027 |
| 2019/0368971 A1* | 12/2019 | Motomura | G01M 15/102 |
| 2019/0381855 A1* | 12/2019 | Kim | G01C 21/3461 |
| 2020/0109541 A1* | 4/2020 | Aoun | B01D 46/444 |

FOREIGN PATENT DOCUMENTS

| | | |
|---|---|---|
| KR | 1020090095328 A | 9/2009 |
| KR | 100928589 B1 | 11/2009 |
| KR | 1020110015755 A | 2/2011 |
| KR | 1020110061669 A | 6/2011 |
| KR | 101193483 B1 | 10/2012 |

\* cited by examiner

TANK STATE-DETECTING BREATHING AIR CHARGER

CROSS-REFERENCE TO RELATED APPLICATIONS

This application is a U.S. National Phase of International Application No. PCT/KR2017/008678, filed Aug. 10, 2017, which claims priority to Korean Patent Application No. 10-2016-0108808, filed Aug. 26, 2016, the entire contents of which are hereby incorporated by reference.

TECHNICAL FIELD

The present invention relates to a breathing air charger for detecting a tank state. More particularly, the present invention relates to a breathing air charger for detecting a tank state, capable of providing air properly adjusted in the concentration of oxygen and nitrogen to a breathing air tank used by a firefighter or a scuba diver, and of effectively discharging air from the breathing air tank.

BACKGROUND ART

In general, firefighters performing work of saving a life in fire, scuba divers enjoying underwater sports or performing underwater work, and persons requiring breathing air for medical purposes breathe by using breathing air tanks charged with the breathing air.

In the case of the breathing air tank, when a residual amount of air is reduced after the breathing air tank is used, new breathing air is charged in the breathing air tank for use. Even if the breathing air tank is not used, when the breathing air tank is planned to be neglected for a long time of about 3-4 months, internal residual air is discharged to prevent the contamination of the air inside the tank and new breathing air is charged in the tank for use.

Recently, there have been provided, as means for charging new breathing air in a breathing air tank, a product distributed by compressing normal air (containing about 20 volume/% of oxygen and about 80 volume % of nitrogen) under high pressure and charging the compressed air in a tank, and a product distributed in the market by separately containing oxygen and nitrogen in liquid phase in a tank.

Generally, in the case of breathing air or industrial air, it is necessary to separate oxygen and nitrogen depending on the use purposes such as aquatic sports, the medical use, the general industrial use, or the like, and it is necessary to properly adjust the concentration of oxygen or nitrogen to be appropriate to the use purpose.

By example of such a product, Korean Patent Registration No. 10-0928589 discloses an apparatus for separating and supplying mixed gas, which separates mixed gas having at least two types of gas into individual gas ingredients.

However, the apparatus for separating and supplying mixed gas has a disadvantage in terms of energy or space layout since two compressors driven by individual driving force are separately operated.

In addition, currently, according to a manner of adjusting the concentration of oxygen or nitrogen, the ratio of oxygen or nitrogen is manually adjusted by using 100 volume % of pure oxygen for the medical use or 100 volume % of pure nitrogen for the industrial use. Accordingly, the concentration of oxygen or nitrogen may not be exactly adjusted, the efficiency in work of adjusting the concentration may be degraded, and the optimal concentration suitable for various fields and environments and various conditions may not be obtained.

A breathing air tank used in a fire station to save a life is charged therein with air at the pressure of about 150-300 bar.

Since the air charged in the breathing air tank is contaminated when the charged air is neglected for a long time, the air charged in the breathing air tank is managed with the expiration period of three months according to international regulations.

Accordingly, a breathing air tank, which is almost expired, has been managed in such a manner that the internal air of the breathing air tank is discharged and discarded and the breathing air tank is charged with new air.

The breathing air tank is typically made of aluminum, and the aluminum tank is corroded after a specific period to produce dust harmful to a human body.

However, since there is currently absent a manner of finding the corrosion of the breathing air tank in advance, the air contaminated with the harmful dust may be taken by a user, thereby causing an emergency situation.

For example, according to a Material Safety Date Sheet of Korea Industrial Safety Management Corporation in Ministry of Labor, when a firefighter inhales Iron, manganese, aluminum, or the like produced due to the corrosion of the breathing air tank used by the firefighter for a short term, hypothermia, fever, vomiting, diarrhea, respiratory difficulty, emotional disorders, muscle spasms, visual disturbance, disorders in lungs, kidneys, liver, and brain, paralysis, and convulsions may be caused. In addition, when the firefighter inhales the air for a long term, a severe problem may be caused in a reproductive system together with anorexia, weight loss, dyspnea, headache, sleep, vocal, and emotional disorders, hallucinations, emotional changes, hearing loss, disorders in lung, liver, kidney, and nerves, and abnormal birth.

In addition, before the breathing air tank is re-charged with air, when the internal pressure of the breathing air tank having the air remaining after use is released in the air by opening a valve, the breathing air tank may be cooled. Simultaneously, moisture in the air is infiltrated into the tank to cause the corrosion of the tank. In addition, when the internal higher pressure of the tank is released to the air, loud noise may be caused. Accordingly, there are required countermeasures against the above problems.

Patent Document (Patent document 1) Korean Patent Registration No. 10-0928589
(Patent document 2) Korean Unexamined Patent Publication No. 10-2009-0118138

DISCLOSURE

Technical Problem

Accordingly, the present invention is suggested while keeping in mind the above problems, and an object of the present invention is to provide a breathing air charger for detecting a tank state, in which, when oxygen and nitrogen are separated from each other to be used for various purposes, such as the use of a firefighter, the use of a scuba diver, a medical purpose, or an industrial purpose, in various fields, an oxygen/nitrogen separator in a membrane manner, a multi-stage compression-type high pressure compressor, and a control manner of adjusting the concentration of oxygen or nitrogen to be the ratio of 20-90 volume % are employed to implement an integral-type higher pressure air charger having new functions, thereby properly adjusting the concentration of oxygen or nitrogen to be a concentration required by a user or a use place and providing the oxygen or the nitrogen, significantly reducing the whole scale of facilities, and saving energy as one driving power is used.

In addition, another object of the present invention is to provide a breathing air charger for detecting a tank state, in which, when air is discharged from a breathing air tank, a specific amount of air is allowed to remain in the tank to make an inner part of the tank in a positive pressure state, thereby preventing dew from being concentrated as air is infiltrated into the tank, to basically solve the problem of the corrosion of the tank, so the durability of the tank is improved and a user inhales clean air.

In addition, another object of the present invention is to provide a breathing air charger for detecting a tank state, in which, when the air is discharged from the breathing air tank, a fine dust sensor provided on an air discharge line measures corroded dust contained in the air to check the state and the corrosion degree of the tank, thereby providing information on internal foreign matters of the tank, which is related to the safety use of the tank, to a user, and preventing the tank from being, in advance, exploded in charging as the tank is weakened due to the corrosion, to ensure the safety in the use of the tank.

In addition, another object of the present invention is to provide a breathing air charger for detecting a tank state, capable of improving the convenience and efficiency in the whole system operation related to the automatic charging and discharging of the air, by implementing a system of automatically performing the process of charging and discharging the air while monitoring the internal state of the breathing air tank and properly controlling various valves or sensors on air charging and discharging lines Technical Solution In order to accomplish the above objects, a breathing air charger for detecting a tank state, which is provided in the present invention, has following features.

The breathing air charger for detecting a tank state includes a system including a fine dust sensor that is provided on an air discharge line of a breathing air tank, which contains high-pressure air provided from a high-pressure air charger, to sense a concentration of fine dust contained in air discharged from the breathing air tank, and a controller that compares a detection value of the concentration of the fine dust, which is input from the fine dust sensor, with a preset fine dust concentration reference value and outputs an alert signal when the detection value of the concentration of the fine dust is equal to or greater than the preset fine dust concentration reference value.

In this case, the breathing air charger for detecting a tank state may further include an air pressure sensor provided at one side of an air supply line of the breathing air tank to detect pressure of the air discharged from the breathing air tank, and an automatic switch valve provided on the air discharge line to control the flow of the air.

Accordingly, when the air is discharged from the breathing air tank, the controller compares an air pressure detection value, which is input from the air pressure sensor, with a preset air pressure reference value and controls the operation of the automatic switch valve to be turned off to block the air from being discharged, when the air pressure detection value reaches the air pressure reference value.

In addition, the breathing air charger may further include a silencer provided at an end portion of the air discharge line of the breathing air tank to attenuate noise generated when the air is discharged.

The air supply line connected with the air discharge line, which extends from the breathing air tank, is connected between the high-pressure air charger and the breathing air tank, and a check valve is provided on the air supply line to block the air from moving to the high-pressure air charger.

In particular, the high-pressure air charger of the breathing air charger for detecting the tank state includes a multi-stage compression-type compressor having a plurality of compression units connected with respective lines, in which external air introduced through a main air line is compressed in multiple stages while sequentially passing through the compression units, to compress air while being driven by one power, an oxygen/nitrogen separator that is provided on a discharge/suction line provided between a first stage compression unit and a second stage compression unit in the multi-stage compression-type compressor to separate oxygen and nitrogen, which is contained in the air, from each other in a membrane manner, and an air cooling and purifying filter unit that is provided on at least one line of each discharge/suction line connecting the compression units in the multi-stage compression-type compressor to each other and a discharge line of a final compression unit to cool and purify the air.

Accordingly, the high-pressure air charger to adjust the concentrations of oxygen and nitrogen may separate oxygen and nitrogen in the air from each other, may properly adjust the separated oxygen or nitrogen, and may provide the oxygen or nitrogen to a user or a use place.

In particularly, a sub-air line may be connected to a discharge/suction line provided between the second-stage compression unit in the multi-stage compression-type compressor and the oxygen/nitrogen separator to additionally introduce air.

In addition, the high-pressure air charger to adjust the concentrations of oxygen and nitrogen may further include a bypass pipe interposed between the first stage compression unit and the second stage compression unit to compress and provide only air having 20 volume % of oxygen, such that the air does not pass through the oxygen/nitrogen separator if necessary.

In this case, the high-pressure air charger to adjust the concentrations of oxygen and nitrogen may further include the solenoid valves and flow meters that are provided on an oxygen discharge line and a nitrogen discharge line provided on the oxygen/nitrogen separator, and on the sub-air line to control an amount of the air flowing the lines and flow of the air, and a controller that controls operations of the solenoid valves and flow meters to control the concentration of the oxygen or the nitrogen.

In this case, the high-pressure air charger to adjust the concentrations of oxygen and nitrogen may further include an oxygen/nitrogen concentration sensor provided on the discharge/suction line, which is connected to the second stage compression unit in the multi-stage compression-type compressor, to detect the concentrations of oxygen and nitrogen. Accordingly, the controller may control operations of the solenoid valves and flow meters in response to a signal received from the oxygen/nitrogen concentration sensor.

In addition, the multi-stage compression-type compressor may include the first stage compression unit, the second compression unit, and a third stage compression unit, and each of the first stage compression unit, the second compression unit, and the third stage compression unit may include a first stage piston, a second stage piston, and a third stage piston reciprocating while operating together with one output side. In the case of the first to third compression units at the respective stages of the multi-stage compression-type compressor, as the stage becomes higher, the greater compression capacity, that is, the greater compression pressure may be used, thereby representing the effective compression performance.

Further, the high-pressure air charger to adjust the concentrations of oxygen and nitrogen may further include a condensate water separation unit that is provided on at least one line of each discharge/suction line connecting the compression units in the multi-stage compression-type compressor to each other and a discharge line of a final compression unit to remove moisture from the air.

Advantageous Effects

A breathing air charger for detecting a tank state, which is provided in the present invention, has following advantages.

First, the configuration of the multi-stage compression-type high pressure compressor is integrated with the configuration of an oxygen generator to adjust the concentrations of oxygen and nitrogen, thereby providing, through one product, air including oxygen having the higher concentration (100 volume %) from oxygen having a normal concentration (atmospheric level) of 20 volume %, depending on the necessities of a user. Accordingly, the breathing air charger is efficiency in terms of use or operation, and may save energy by utilizing one driving power. In addition, the whole scale of facilities may be significantly reduced, so the breathing air charger has the advantage in terms of the layout related to space utilization.

Second, oxygen and nitrogen are separated from each other by the oxygen/nitrogen separator. The oxygen may be compressed when the user needs the oxygen depending on the purposes of the user, and the nitrogen may be compressed when the user needs the nitrogen. Meanwhile, after the user selects the oxygen and the nitrogen, which are to be charged at the higher pressure, the concentration of the oxygen and the nitrogen may be properly adjusted and supplied. Accordingly, the oxygen or the nitrogen having the optimal concentration suitable for various fields, various environments, and various conditions may be provided to improve the efficiency in the use of the oxygen or the nitrogen.

Third, when the tank is emptied by discharging internal air from the tank, the internal pressure of the tank is made to be about 5 bars. This is because, when internal remaining pressure is released from the tank, cooling occurs. Accordingly, to prevent an aluminum material inside the tank is corroded as dew is concentrated inside the tank when the air is infiltrated into the tank, the dried compressed air remains, thereby preventing the tank from being corroded.

In other words, the international standard of moisture in the compressed air for respiratory corresponds to dried air having the dew-point temperature of −54° C. Accordingly, since the internal pressure of the tank having such dried air is released, air having a specific value (about 5 bar) or less remains such that the inner part of the tank is made in the positive pressure state. Accordingly, the dew is not concentrated inside the tank, and the cause of corroding the tank is prevented in advance, thereby ensuring the durability of the tank and basically removing corroded dust.

Fourth, the fine dust sensor is attached to a line, which does not directly receive pressure, of limes for releasing the internal pressure of the tank for use. Accordingly, the fine dust sensor may be easily applied to a low-temperature environment and used.

Fifth, when the tank is corroded, powers are generated from internal aluminum to produce fine dust. The air discharged when the internal remaining pressure of the tank is released passes through the fine dust sensor, the internal corroded powders of the tank are measured, and the measurement result is provided to the user. Accordingly, human injury, such as the damage to the lung of the user, which results from the use of the corroded tank, may be prevented and the tank weakened due to the corrosion in the inner part of the tank is prevented from being exploded while the tank is charged with air, in advance, by verifying the tank state, thereby minimizing the severe human and material damage.

Sixth, a silencer is mounted at an end of a line for discharging the internal pressure of the tank before the tank is charged with air, thereby basically removing the environment of causing noise to a user as the high-pressure air is discharged.

Seventh, the part to supply high-pressure air and a part to monitor the state of the tank are implemented integrally with each other, the cause of corroding the tank is removed, and a convenience function of removing remaining pressure is provided. Accordingly, an automatic operation concept is provided to a user, thereby improving the convenience and the efficiency in the whole system operation.

MODE FOR INVENTION

Hereinafter, the present invention will be described in detail with reference to accompanying drawings.

Figure 1:
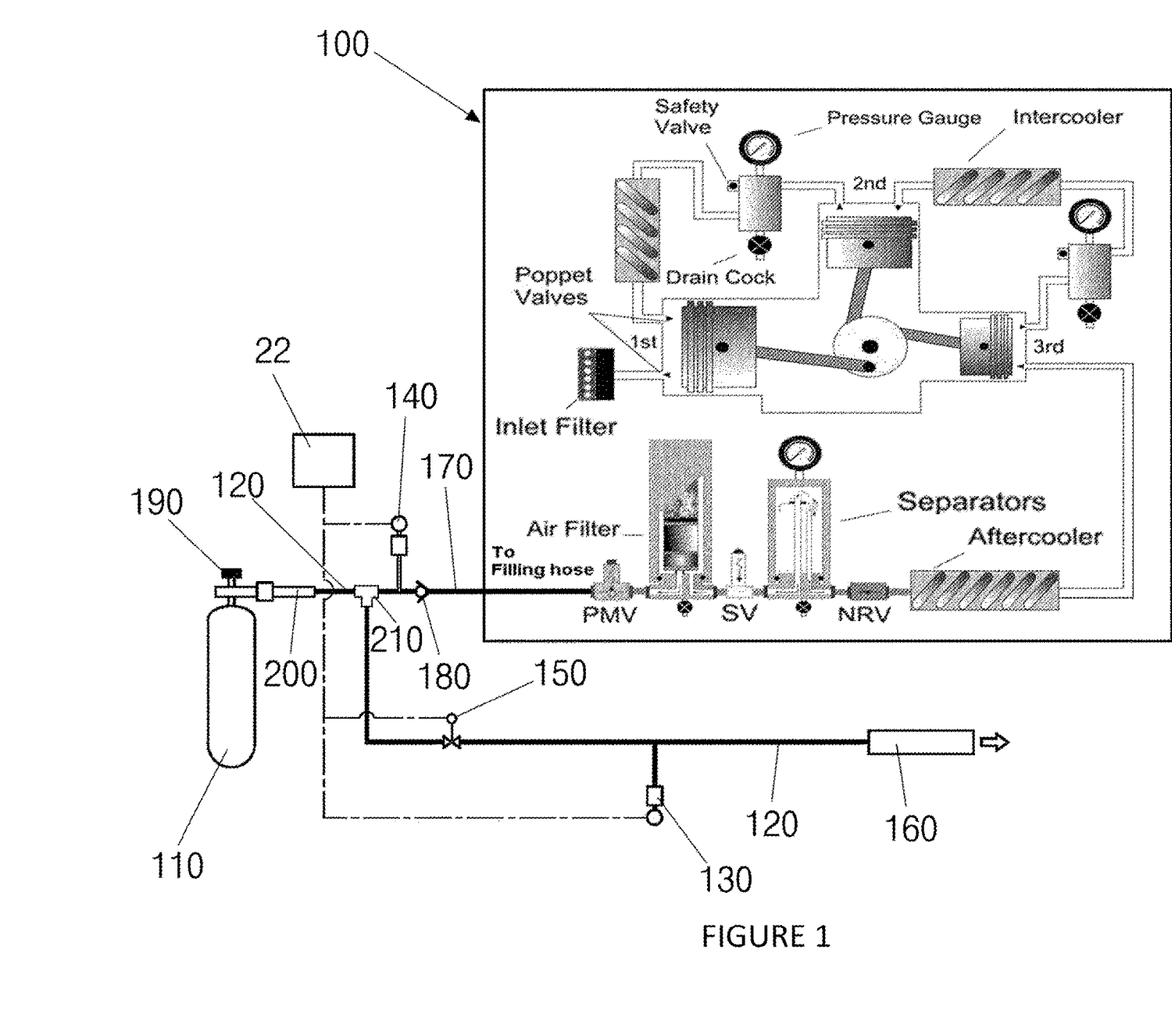
FIG. 1 is a schematic view illustrating a part to monitor an internal state of a breathing air tank in a breathing air charger for detecting a tank state, according to an embodiment of the present invention.

FIG. 1 is a schematic view illustrating a part to monitor an internal state of a breathing air tank in a breathing air charger for detecting a tank state, according to an embodiment of the present invention.

As illustrated in FIG. 1, the breathing air charger for detecting the tank state has a structure and a system capable of performing functions of checking fine dust, such as corrosion dust, harmful to a human body when pulling out the internal air of a breathing air tank, and of making a specific amount of air, which is inside the breathing air tank, remaining and being at positive pressure.

To this end, an air discharge line 120 extends, through a connector 200 having a typical detachable structure, with a specific length from an inlet of the breathing air tank 110 used by a firefighter or a scuba diver, that is, an air inlet provided at an upper portion of the breathing air tank 110, which is attached with a tank valve 190 opening or closed through manual handling.

A portion of the air discharge line 120 branches by a piping 210. In this case, a line branching from the piping 210 is connected to the discharge side of a high-pressure air charger 100

In other words, an air supply line 170, which extends while being connected to a discharge line (reference number 15 of FIGS. 3 and 4) of the high-pressure air charger 100 through a connector (not illustrated), may be connected to the piping 210, and thus the air discharge line 120 may communicate with the air supply line 170 through the piping 210.

In addition, a check valve 180 is provided on the air supply line 170 to block air from moving to the high-pressure air charger 100. Accordingly, high-pressure compressed air supplied from the high-pressure air charger 100 may be charged in the breathing air tank 110 through the air supply line 170 and the air discharge line 120. However, the air discharged from the breathing air tank 110 may be blocked by the check valve 180 and thus not transferred to the high-pressure air charger 100.

In particular, a fine dust sensor 130 is provided on the air discharge line 120 extending from the breathing air tank 110 to sense the concentration of fine dust contained in the air discharged from the breathing air tank 110.

The fine dust sensor 130 is provided at a position that hardly receives the pressure of air discharged from the breathing air tank 110. For example, the fine dust sensor 130 may be provided at a position adjacent to an end portion of the air discharge line 120 having a silencer 160 which is attached thereto and is to be described below. Accordingly, the fine dust sensor 130 may be easily applied and used even in a low-pressure environment.

The detection value of the concentration of fine dust, which is measured by the fine dust sensor 130, is transmitted to a controller 22. The controller 22 may compare the detection value of the concentration of the fine dust, which is input from the fine dust sensor 130, with a preset fine dust concentration reference value and may output an alert signal when the detection value of the concentration of the fine dust is equal to or greater than the fine dust concentration reference value.

In this case, the alert signal output from the controller 22 may be applied to a display manner through a monitor (not illustrated) and a manner of generating an alert sound using a buzzer (not illustrated).

The fine dust concentration reference value may be set through several-time calibration. For example, according to the present invention, the fine dust concentration reference value may be set to 2-3 $\mu g/m^3$, preferably, 2.5 $\mu g/m^3$.

Accordingly, when the concentration of the fine dust in air discharged from the breathing air tank 110 is measured and is equal to or greater than 2-3 $\mu g/m^3$, an alert is transmitted to the user to inform that the state of the breathing air tank 110 is not normal, such that the user take countermeasures such as the replacement of the breathing air tank 110 with new one. Accordingly, the human injury such as the damage to the lung of the user, which results from the use of the corroded tank, may be prevented. In addition, the tank is prevented from being, in advance, exploded in charging as the tank is weakened due to the corrosion, thereby preventing the severe human and material damage.

In addition, an air pressure sensor 140 is provided to detect the pressure of the air discharged from the breathing air tank 110.

In this case, the air pressure sensor 140 may be provided at one side of the air supply line 170, for example, at one side of a unit between the check valve 180 provided on the air supply line 170 and the piping 210 connecting the air supply line 170 with the air discharge line 120.

The air pressure value sensed by the air pressure sensor 140 is transmitted to the controller 22. In this case, a pressure gage may be coupled to the air pressure sensor 140 such that the pressure value sensed by the air pressure sensor 140 is recognized at the outside.

In addition, an automatic switch valve 150 is provided on the air discharge line 120 of the breathing air tank 110 to control the flow of the air discharged along the line.

Such an automatic switch valve 150 is turned on (open) and turned off (closed) under the control by the controller 22.

In this case, preferably, the automatic switch valve 150 is provided at a rear portion of the air discharge line 120 to prevent interference when the breathing air tank 110 is charged with air supplied from the high-pressure air charger 100.

Accordingly, if a present air pressure detection value, which is measured by the air pressure sensor 140 when the air is discharged from the breathing air tank 110, is input to the controller 22, the controller 22 compares the air pressure detection value, which is input from the air pressure sensor 140, with a preset air pressure reference value (e.g., 1-10 bar, preferably, 5 bar). Then, when the air pressure detection value reaches the air pressure reference value, the controller 22 may control the operation of the automatic switch valve 150 to be turned off to block the air from being discharged. Accordingly, air may remain at specific pressure (e.g., about 5 bar) inside the breathing air tank 110 and the discharge of the air may be finished.

As described above, when the air is discharged from the breathing air tank 110 such that new compressed air is charged in the breathing air tank 110, air remains in specific amount or less in the breathing air tank 110 such that the inner portion of the breathing air tank 110 is made in the positive pressure state, thereby preventing dew from being concentrated. Accordingly, aluminum inside the tank may be basically prevented from being corroded.

In addition, the silencer 160 is provided at an end portion of the air discharge line 120 of the breathing air tank 110 to attenuate noise generated when the air is discharged.

As described above, a silencer is provided at an end of a pipe for releasing internal pressure of the breathing air tank 110, thereby basically removing an environment of causing noise with respect to the user as high-pressure air is discharged.

In particular, the present invention provides a system for automatically performing, under the control of the controller 22, a process of charging high-pressure air between the high-pressure air charger 100 and the breathing air tank 110, a process of discharging air from the breathing air tank 110, and a process of detecting fine dust (e.g., dust from the corroded aluminum tank) discharged from the breathing air tank 110.

Figure 2:
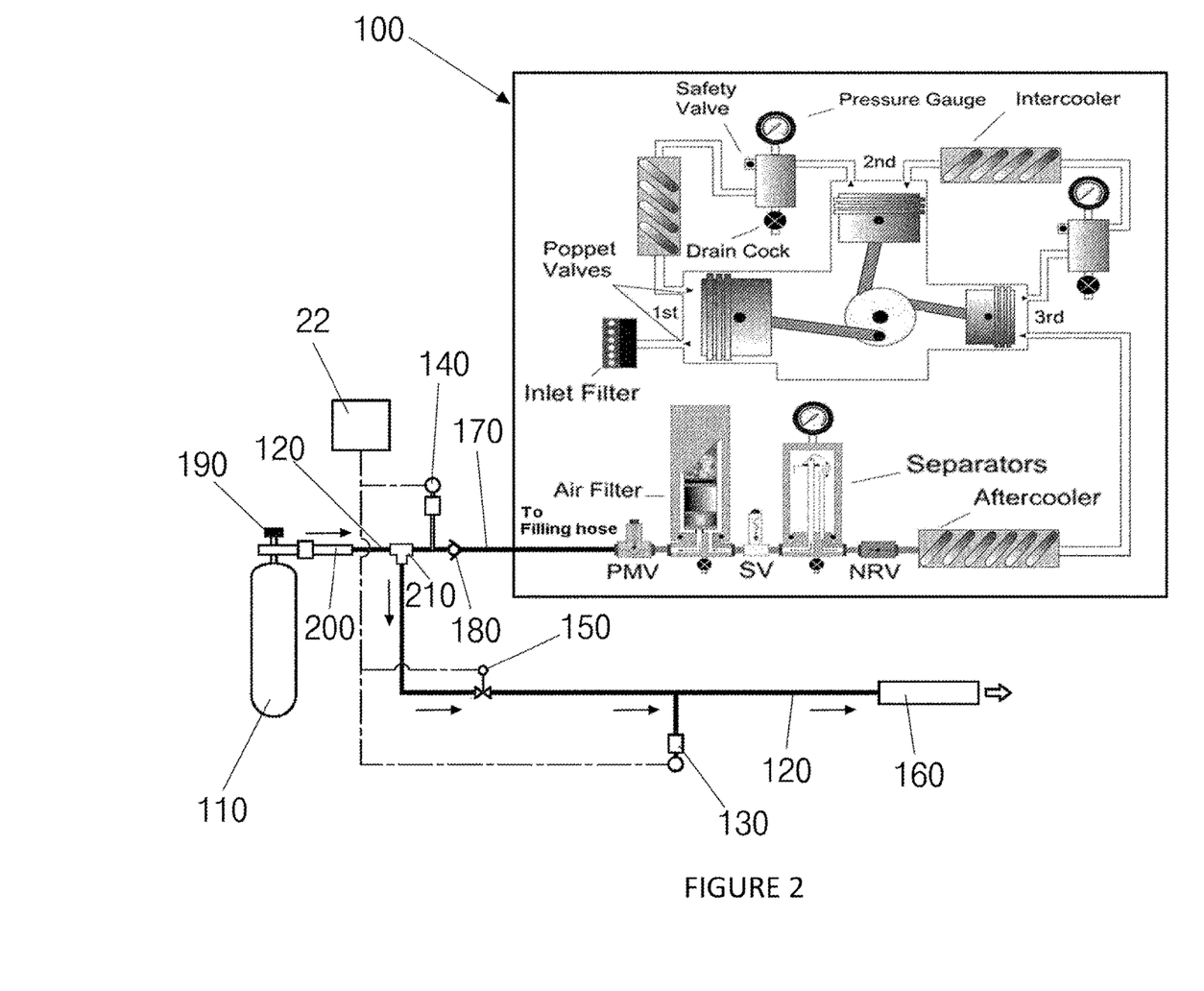
FIG. 2 is a schematic view illustrating the operating state of a part to monitor an internal state of a breathing air tank in a breathing air charger for detecting a tank state, according to an embodiment of the present invention.

In other words, the operation of the automatic switch valve 150 may be automatically performed in response to the output control of the controller 22 receiving the signal of the air pressure sensor 140, and the operation of discharging the air from the breathing air tank 110 linked to the actuation and the stop of the high-pressure air charger 100 may be automatically performed.

For example, the process of discharging the air from the breathing air tank 110 and the process of charging compressed air (the compressed air having nitrogen and oxygen properly adjusted in concentration thereof) supplied from the high-pressure air charger 100 after discharging the air, are automatically performed continuously under the control of the controller 22, in the state that the high-pressure air charger 100 and the breathing air tank 110 are connected to the air supply line 170 and the air discharge line 120.

To this end, in the state that the operation of the high-pressure air charger 100 is stopped under the control of the controller 22, a user manually opens the tank valve 19 attached to the breathing air tank 110 and subsequently, the automatic switch valve 150 is turned on by the control of the controller 22. In this case, the internal air of the breathing air tank 110 is discharged to the outside through the air discharge line 120.

In this case, the pressure of the air discharged along the air discharge line 120 is detected by the air pressure sensor 140 and provided to the controller 22 in real time.

In addition, the fine dust in the air discharged along the air discharge line 120 may be measured by the fine dust sensor 130. The fine dust concentration detection value measured by the fine dust sensor 130 is provided to the controller 22 and used as data for determining the corrosion state of the tank.

Subsequently, in the process of discharging the air from the breathing air tank 110, when the air pressure detection value measured by the air pressure sensor 140 is less than a preset air pressure reference value, for example, 5 bar, the controller 22 controls the automatic switch valve 150 to be turned off to stop discharging the air.

In this case, since dried air at the pressure of about 5 bar remains inside the breathing air tank 110, dew is not prevented from being concentrated inside the breathing air tank 110.

Then, the high-pressure air charger 100 is operated again by the control of the controller 22. The air supplied from the high-pressure air charger 100 is charged in the breathing air tank 110 through the air supply line 170 and the air discharge line 120.

The pressure of the air supplied along the lines in the process of charging air in the breathing air tank 110 is detected by the air pressure sensor 140 and transmitted to the controller 22 in real time. In this case, when the detected pressure reaches preset pressure, for example, 200-300 bar, preferably, 300 bar, the charging is determined as being completed and thus the operation of the high-pressure air charger 100 is stopped by the control of the controller 22, thereby finishing re-charging of the air after discharging the air.

Figure 3:
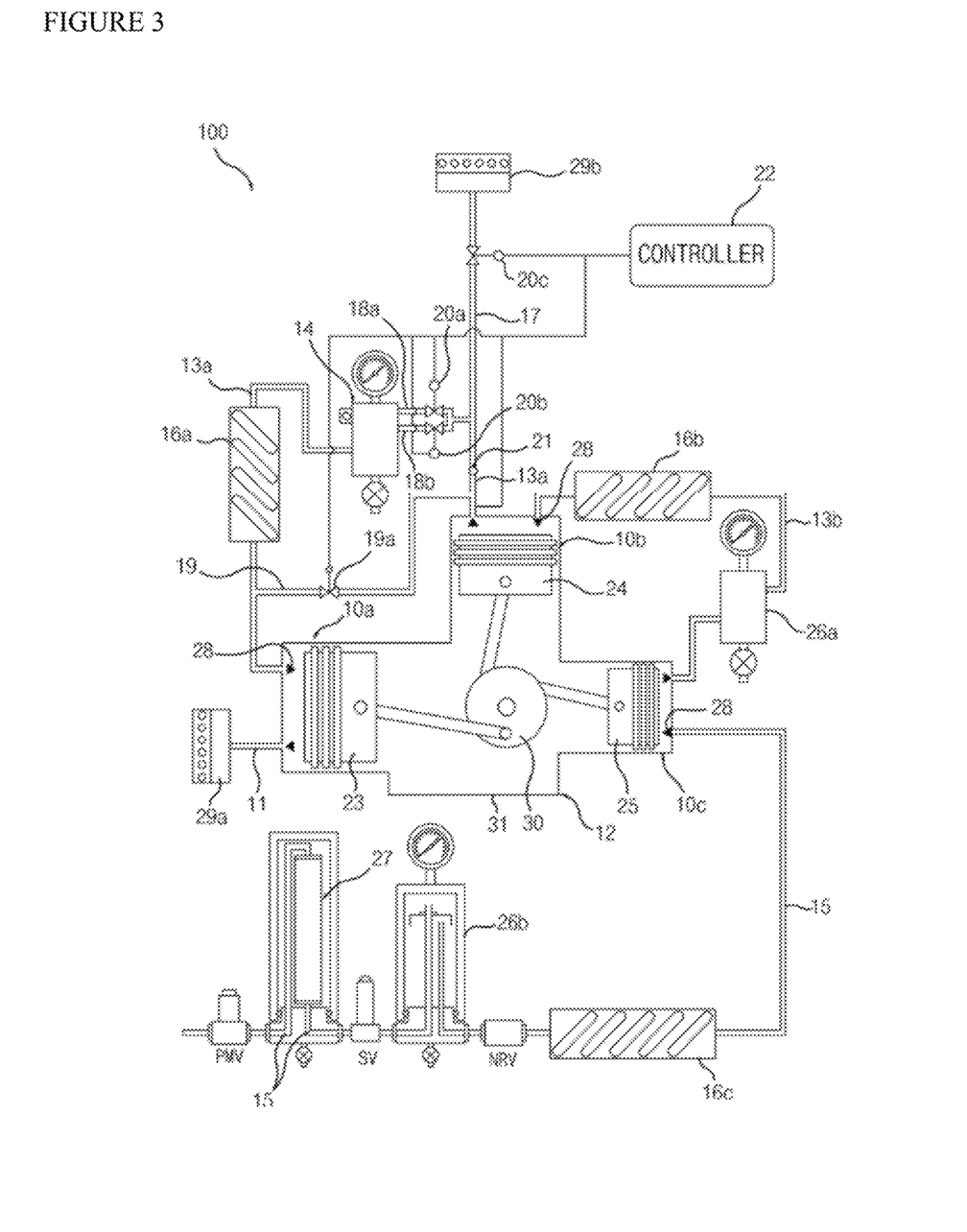
FIG. 3 is a schematic view illustrating a high-pressure air charger in a breathing air charger for detecting a tank state, according to an embodiment of the present invention.

FIG. 3 is a schematic view illustrating the high-pressure air charger in the breathing air charger for detecting the tank state, according to an embodiment of the present invention.

As illustrated in FIG. 3, the high-pressure air charger 100 may properly adjust the concentration of oxygen or nitrogen in the air to be within the range of 20 volume % to 90 volume % appropriately to each use place. In particular, the high-pressure air charger has a structure for optimizing the scale and the layout of the whole system through the proper arrangement of a multi-stage compression-type compressor and the lines.

To this end, the high-pressure air charger includes an integral-type multi-stage compression-type compressor 12 to compress air in multiple stages while being driven by one driving power.

Typically, a multi-stage compression-type compressor may be configured in at least two stages depending on pressure to be used. For example, the multi-stage compression-type compressor may be configured in three or four stages when the used pressure is in the range of 200-300 bar, configured in five stages when the used pressure is in the range of 400-700 bar, and configured in at least six stages when the used pressure is 700 bar or more.

For example, when the multi-stage compression-type compressor 12 is configured in three stages, a plurality of compression units arranged in tri-directions from a compressor body 31 may have for example, a cylinder arrangement form in the T shape, V shape, or W shape in which the compression units are arranged at 90 degrees. In the T shape, as illustrated in the drawing, the multi-stage compression-type compressor 12 may include a first stage compression unit 10a, a second stage compression unit 10b, and a third stage compression unit 10c.

According to an exemplary embodiment, the first stage compression unit 10a, the second stage compression unit 10b, and the third stage compression unit 10c are arranged at the interval of about 90° along the circumference of a driving disc 30 around the driving disc 30 (while placing one power transmission unit of a crank shaft among the first stage compression unit 10a, the second stage compression unit 10b, and the third stage compression unit 10c).

The first stage compression unit 10a, the second stage compression unit 10b, and the third stage compression unit 10c have a first stage piston 23, a second stage piston 24, and a third stage piston 25, respectively, to compress air while reciprocating. In this case, the pistons 23, 24, 25 are connected to one driving disc 30 through rods, with a phase difference.

Accordingly, when the driving disc 30 is rotated by receiving power from a driving source, such as a motor (not illustrated), the pistons 23, 24, and 25 reciprocate in the respective compression units 10a, 10b, and 10c. Therefore, air is sucked and discharged in a compressed state due to the sequential reciprocation of the pistons.

Each of the compression units 10a, 10b, and 10c has a suction port and a discharge port each having a poppet valve 28. Each of the suction port and the discharge port is connected to an atmospheric side line, a discharge side line, a suction side line, a final discharge side line, respectively.

For example, the suction port and the discharge port of the first stage compression unit 10a are connected to a main air line 11 and a discharge/suction line 13a, respectively, and the suction port and the discharge port of the second stage compression unit 10b are connected to two discharge/suction lines 13a and 13b, respectively. The suction port and the discharge port of the third stage compression unit 10c are connected to the discharge/suction line 13b and a discharge line 15, respectively.

Accordingly, the air flows through the path of the main air line 11→the first stage compression unit 10a→the discharge/suction line 13a→the second stage compression unit 10b→the discharge/suction line 13b→the third stage compression unit 10c→the discharge line 15. Accordingly, the external air introduced through the main air line 11 may be compressed in multiple stages while sequentially passing through the compression units 10a, 10b and 10c.

In this case, a dust removing filter 29a may be provided on the main air line 11 to remove dust or foreign matters from air introduced into the compressor.

In particular, in the case of the first to third stage compression units 10a, 10b, and 10c at the respective stages of the multi-stage compression-type compressor 12, as the order of the stage becomes higher, the greater compression pressure may be used.

For example, in the case of a three-stage compression structure, the first stage compression unit 10a may have a compression capacity of 0 bar or more and less than 10 bar, the second stage compression unit 10b may have a compression capacity of 10 bar or more and less than 50 bar, and the third stage compression unit 10c may have a compression capacity of 60 bar or more.

For reference, in the case of a four-stage compression structure, compression may be made by more reducing the pressure at each compression stage such that the first stage compression unit has the compression capacity of 0-5 bar, the second stage compression unit has the compression capacity of 5-20 bar, the third stage compression unit has the compression capacity of 20-100 bar, and the fourth stage compression has the compression capacity of at least 100 bar.

In this case, the compression capacity of each compression unit may be appropriately set in consideration of the compression volume of a compression chamber, the piston diameter, and the like.

Accordingly, air introduced into the first stage compression unit 10a may be increased to 5 bar or more and less than 50 bar in pressure by one step and transferred to the second stage compression unit 10b. The air introduced into the second stage compression unit 10b may be increased to 50 bar or more and less than 100 bar in pressure by two steps and transferred to the third stage compression unit 10c. The air introduced into the third stage compression unit 10c may be increased to 100 bar or more in pressure by three steps and transferred to the final use place.

As described above, in the case of the multi-stage compression-type compressor 12, the compression unit 10a, 10b, and 10c are arranged in tri-directions in the compressor body 31, and the main air line 11, the discharge and suction lines 13a and 13b, and the discharge line 15 are arranged around the compressor body 31 together with an oxygen/nitrogen separator 14, which is to be described later, and have the structure appropriately connected with the compression units 10a, 10b, and 10c, thereby minimizing the space occupation rate or the scale, so the whole facility layout may be effectively designed.

In addition, the high-pressure air charger 100 to adjust the concentration of oxygen or nitrogen includes a bypass pipe 19 which may be involved in adjusting the concentration of oxygen or nitrogen by additionally employing the air and may compress and provide only the air having about 20 volume % of oxygen. The bypass pipe 19 is interposed between the first stage compression unit 10a and the second stage compression unit 10b to allow the air not to pass through the oxygen/nitrogen separator 14 if necessary.

A sub-air line 17 is connected onto the discharge/suction line 13a connected between the first stage compression unit 10a and the second stage compression unit 10b to adjust the concentration of oxygen or nitrogen in gas finally compressed.

In other words, the sub-air line 17 is connected onto the discharge/suction line 13a which is a joining line of rear ends of an oxygen discharge line 18b and a nitrogen discharge line 10a extending from the oxygen/nitrogen separator 14.

A dust removing filter 29b may be provided on the sub-air line 17 to remove dust or foreign matters from the air introduced into the compressor.

Accordingly, air introduced from the first stage compression unit 10a through the bypass pipe 19 and having about 20 volume % of oxygen is introduced into the second stage compression unit 10b without passing through the oxygen/nitrogen separator 14. Meanwhile, air introduced through the sub-air line 17 and having about 20 volume % of oxygen is mixed with oxygen or nitrogen discharged from the oxygen/nitrogen separator 14 at a specific ratio and introduced into the second stage compression unit 10b.

As described above, the sub-air line 17 is connected to the suction side of the second stage compression unit 10b and the air additionally introduced through the sub-air line 17 may be properly utilized in adjusting the concentration of oxygen or nitrogen. The oxygen or nitrogen having the adjusted concentration may widen the selections required in a use place or a user, thereby extensively ensuring the performance and the function of the high-pressure air charger.

In this case, the bypass pipe 19 and the sub-air line 17 are provided to the multi-stage compression-type compressor 12 and are operated together, thereby sufficiently ensuring the compression volume of the compressor and enhancing the energy efficiency.

For example, when only air having about 20 volume % of oxygen is supplied, the air may be sucked in a sufficient compression volume through the first stage compression unit 10a and may be supplied through the bypass pipe 19. Accordingly, a desired amount of air may be ensured with respect to the operation efficiency of the compressor.

When only air having about 20 volume % of oxygen is supplied, the bypass pipe 19 is used. When the air is supplied by adjusting the ratio of the concentration of oxygen in the air, the sub-air line 17 is used, thereby reducing the energy loss of the compressor, and ensuring and providing a sufficient amount of air.

Meanwhile, when only air having about 20 volume % of oxygen is supplied by using the sub-air line 17 without the bypass pipe 19, the air is sucked and compressed to be supplied through the second stage compression unit 10b having a smaller compression volume. Accordingly, a desired amount of air may not be supplied with respect to the operation efficiency of the compressor. In this case, since the first stage compression unit 10a is in an idle state, energy loss is inefficiently caused.

The high-pressure air charger to adjust the concentration of oxygen or nitrogen includes the oxygen/nitrogen separator 14 to actually separate oxygen and nitrogen in the air from each other.

The oxygen/nitrogen separator 14 is provided on the discharge/suction line 13a connecting the first stage compression unit 10a and the second stage compression unit 10b to separate oxygen and nitrogen in the air from each other in a membrane manner.

For example, in the oxygen/nitrogen separator 14, a gas membrane (gas separation membrane; not illustrated) is illustrated inside a separator case. An internal fluid passage (not illustrated) and an external fluid passage (not illustrated) of the gas membrane inside the separator case are connected two independent lines, that is, the nitrogen discharge line 18a and the oxygen discharge line 18b, respectively.

In this case, in the oxygen/nitrogen separator 14, a PSA manner may be applied in addition to the membrane manner.

The nitrogen discharge line 18a and the oxygen discharge line 18b are jointed together at the rear ends thereof in the forwarding direction and then connected with the discharge/suction line 13a extending to the suction side of the second stage compression unit 10b in the multi-stage compression-type compressor 12.

Accordingly, when the compressed air from the first stage compression unit 10a is introduced into the oxygen/nitrogen separator 14 through the discharge/suction line 13a, oxygen and nitrogen are extracted from the compressed air by the gas membrane. In other words, only oxygen of two types of gas is selectively permeated due the difference in solubility and permeability between oxygen and nitrogen, which result from the partial pressure difference between oxygen and nitrogen, so oxygen and nitrogen are separated from each other. Subsequently, oxygen is discharged to the oxygen discharge line 18b, and nitrogen is discharged to the nitrogen discharge line 18a.

The manner of extracting oxygen and nitrogen from the mixed gas through the principle of the gas membrane is the same as the conventional technology, so the detail thereof will be omitted below.

In addition, the high-pressure air charger to adjust the concentration of oxygen or nitrogen includes air cooling and purifying filter units 16a, 16b, and 16c to cool and purify the compressed air.

The air cooling and purifying filter units 16a, 16b and 16c may be provided on the discharge/suction lines 13a and 13b for connecting the respective compression units 10a. 10b, and 10c of the multi-stage compression-type compressor 12 and the discharge line 15 of the final compression unit.

For example, one air cooling and purifying filter unit 16a is provided on the discharge/suction line 13a between the first stage compression unit 10a and the second stage compression unit 10b, another air cooling and purifying filter unit 16b is provided on the discharge/suction line 13b between the second stage compression unit 10b and the third stage compression unit 10c, and still another air cooling and purifying filter unit 16c is provided on the discharge line 15 extending from the discharge side of the third stage compression unit 13c.

In general, the air introduced from the outside always contains moisture. In particular, when the air is compressed by a compressor using lubricant, the oil component may be mixed into the compressed air.

Therefore, the air cooling and purifying filter units 16a. 16b and 16c may be provided therein with a coalescing filter (not illustrated) to filter out the oil component remaining in a large amount of compressed air supplied from each compression unit and may be provided therein with a cooler (not illustrated) or a dryer (not illustrated) to remove water and the like.

The high-pressure air charger to adjust the concentration of oxygen or nitrogen may include condensate water separation units 26a and 26b positioned at the rear end of the air cooling and purifying filter units to remove moisture.

The condensate water separation units 26a and 26b may be provided on the discharge/suction line 13b for connecting the compression units 10b and 10c with each other and the discharge line 15 of the final compression unit in the multi-stage compression-type compressor 12, respectively, For example, one condensate water separation unit 26a is provided at the rear end of the air cooling and purifying filter unit 16b on the discharge/suction line 13b connected between the second stage compression unit 10b and the third stage compression unit 10c, and another condensate water separation unit 26b is provided at the rear end of the air cooling and purifying filter unit 16c on the discharge line 15 extending from the discharge side of the third stage compression unit 10c.

In this case, the condensate water separation units 26a and 26b have structures including an oil and water separating function to remove the condensed water in the compressed air using the centrifugal force principle.

Since moisture remaining in a large amount of compressed air is removed by the condensate water separation units 26a and 26b, the quality of the compressed air finally supplied may be ensured and the temperature deviation between the components may be minimized in the high-pressure air charger.

Since a high-pressure air purification unit 27 is provided at a rear end of the condensate water separation unit 26b provided on the discharge line 15 extending from the third stage compression unit 10c, foreign matters are finally removed from the high-pressure compressed air and supplied to a use place.

The high-pressure air purification unit 27, which has the structure including a dehumidifying agent and activated charcoal for removing moisture, smell, carbon monoxide, and carbon dioxide from the compressed air, may effectively remove foreign matters from the compressed air using a suction principle.

The high-pressure air charger to adjust the concentration of oxygen or nitrogen includes solenoid valves and flow meters 20a, 20b, 20c, and 19a, an oxygen/nitrogen concentration sensor 21, and a controller 22 to adjust the concentrations of oxygen and nitrogen and to control the adjusting operation.

The solenoid valves and flow meters 20a, 20b, 20c, and 19a, which are valve devices in the form capable of controlling an opening degree, are provided on the oxygen discharge line 18b and the nitrogen discharge line 18a at the oxygen/nitrogen separator 14, the sub-air line 17, and the bypass pipe 19, respectively to control the amount and the flow of the air, that is oxygen and nitrogen which flow through the respective lines.

The solenoid valves and flow meters 20a, 20b, 20c, and 19a may operate under the control of the controller 22 and may adjust an amount of air flowing through the lines as the opening degree is adjusted by the output control of the controller 22.

The oxygen/nitrogen concentration sensor 21, which includes a typical oxygen sensor (not illustrated) and a typical nitrogen sensor (not illustrated), is provided on the discharge/suction line 13a, which is connected to the second stage compression unit 10b inside the multi-stage compression-type compressor 12, to detect the concentrations of oxygen and nitrogen contained in the air flowing through the discharge/suction line 13a.

The oxygen concentration value and the nitrogen concentration value detected by the oxygen/nitrogen concentration sensor 21 are provided to the controller 22 to be used as basic data for controlling the concentrations of the oxygen and nitrogen.

The controller 22, which controls the operations of the solenoid valves and flow meters 20a. 20b, 20c and 19a, may control the operations of the solenoid valves and flow meters 20a, 20b, 20c and 19a in various manners.

For example, the opening degrees of the solenoid valves and flow meters 20a. 20b, 20c, and 19a may be controlled based on a signal input from the oxygen/nitrogen concentration sensor 21 to detect the concentrations of oxygen and nitrogen.

As another example, the opening degrees of the solenoid valves and flow meters 20a. 20b, 20c, and 19a may be controlled based on preset data (that is, preset opening degrees of the solenoid valves and flow meters).

The following description will be made with respect to an example of a manner of adjusting the concentration of oxygen or nitrogen by controlling the operations of the solenoid valves and flow meters 20*a*. 20*b*, 20*c*, and 19*a* through the output control of the controller 22.

For example, regarding the supplying of 100 volume % of oxygen or nitrogen, 100 volume % of oxygen may be supplied by fully opening the solenoid value and flow meter 20*b*, which are provided on the oxygen discharge line 18*b* of the oxygen/nitrogen separator 14, and fully closing the solenoid valve and flow meter 20*a*, which are provided on the nitrogen discharge line 18*a*, in the state that the solenoid valve and flow meter 20*c* provided on the sub-air line 17 and the solenoid value and flow meter 19*a* provided on the bypass pipe 19 are fully closed. Meanwhile, 100 volume % of nitrogen may be supplied by fully closing the solenoid valve and flow meter 20*b* provided on the oxygen discharge line 18*b* of the oxygen/nitrogen separator 14 and fully opening the solenoid valve and flow meter 20*a* provided on the nitrogen discharge line 18*a*.

As another example, regarding the supplying of 50 volume % of oxygen or nitrogen, 50 volume % of oxygen (50 volume % of oxygen being relative to 100 volume % of oxygen supplied in the above example) may be supplied by opening, at 50%, the opening degree of the solenoid value and flow meter 20*b*, which are provided on the oxygen discharge line 18*b* of the oxygen/nitrogen separator 14, and fully closing the solenoid valve and flow meter 20*a*, which are provided on the nitrogen discharge line 18*a*, in the state that the opening degree of the solenoid value and flow meter 19*a* on the bypass pipe 19 are closed at 100% and the opening degree of the solenoid valve and flow meter 20*c* provided on the sub-air line 17 are open at 50%. Meanwhile, 50 volume % of nitrogen (50 volume % of nitrogen being relative to 100 volume % of nitrogen supplied in the above example) may be supplied by fully closing the solenoid valve and flow meter 20*b* provided on the oxygen discharge line 18*b* of the oxygen/nitrogen separator 14 and opening, at 50%, the opening degree of the solenoid valve and flow meter 20*a* provided on the nitrogen discharge line 18*a*.

In this case, basically, the flow rate of the solenoid valve and flow meter 20*c* on the sub-air line is adjusted by the oxygen/nitrogen concentration sensor 21, which serves as a sensor of the oxygen/nitrogen separator 14, and the controller 22 to be matched with the average environment including 20 volume % of oxygen and 80 volume % of nitrogen which are basically included in the air introduced through the sub-air line 17.

As another example, regarding the supplying of typical air, the typical air including about 20 volume % of oxygen may be supplied through the first stage compression unit 10*a* and the dust removing filter 29*a*, when the opening degree of the solenoid valve and flow meter 19*a* on the bypass pipe 19 is open at 100% in the state that the solenoid valves and flow meters 20*a* and 20*b* provided on the oxygen discharge line 18*b* and the nitrogen discharge line 18*a* in the oxygen/nitrogen separator 14 and the solenoid valve and flow meter 20*c* provided on the sub-air line 17 are closed at 100%.

Controlling such as the adjusting of the concentration of oxygen or the concentration of nitrogen, and the supplying of the air may be performed as a worker variously selects the concentration of oxygen or nitrogen within the range of 20 volume % to 100 volume %, and inputs and sets the selected value to the controller. Alternatively, the controlling may be performed through a manner of recognizing the oxygen concentration value or nitrogen concentration value, which is input from the oxygen/nitrogen concentration sensor, to adjust the concentration of oxygen or nitrogen to the concentration in the range of 0-100 volume % such that the opening degree of the solenoid valve and flow meter is in the range of 0% to 100% by the output control of the controller.

Figure 4:
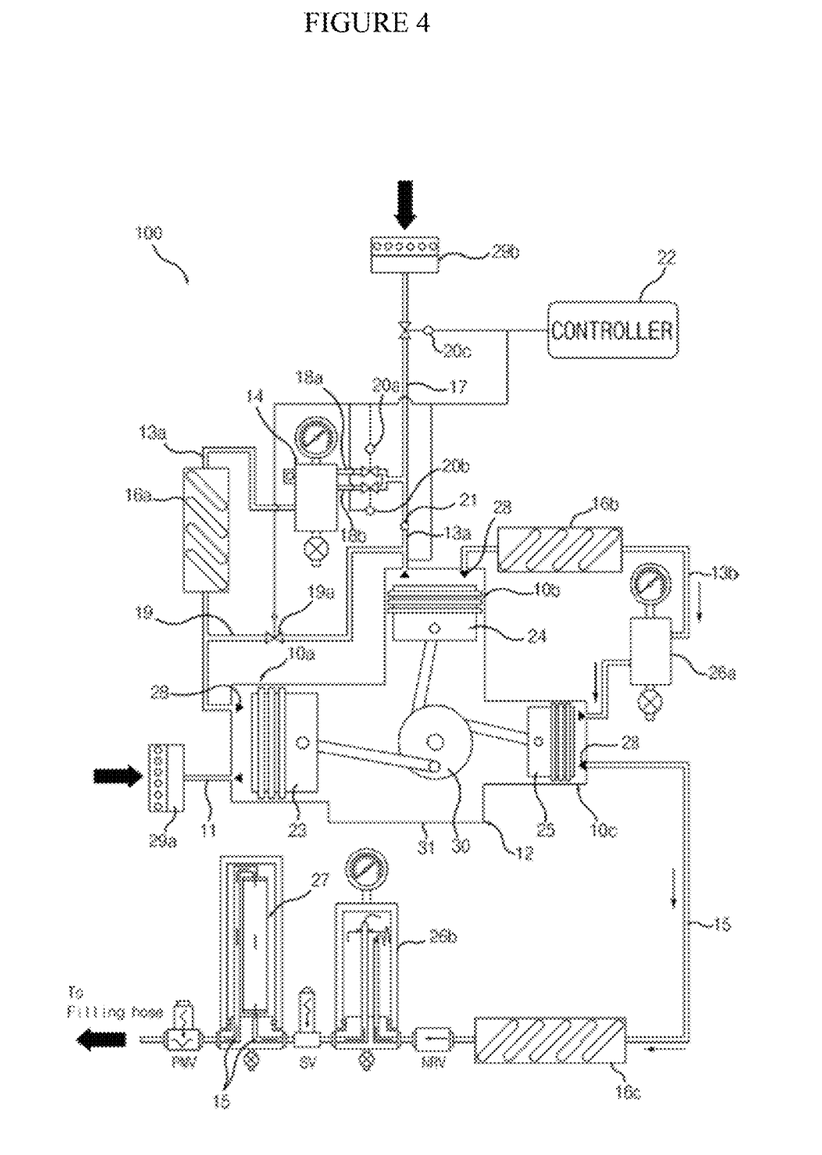
FIG. 4 is a schematic view illustrating the operating state of a high-pressure air charger in a breathing air charger for detecting a tank state, according to an embodiment of the present invention.

Hereinafter, the operating state of the high-pressure air charger having the above configuration will be described.

FIG. 4 is a schematic view illustrating the operating state of a high-pressure air charger in a breathing air charger for detecting the tank state, according to an embodiment of the present invention.

As illustrated in FIG. 4, the pressure of the air input through the main air line 11 is increased to 5 bar or more by one step in the first stage compression unit 10*a* in the multi-stage compression-type compressor 12 and the air is transferred to the oxygen/nitrogen separator 14 through the discharge/suction line 13*a*.

Next, the compressed air input the oxygen/nitrogen separator 14 is divided into oxygen and nitrogen in a membrane manner, and then the oxygen and the nitrogen are discharged to the oxygen discharge line 18*b* and the nitrogen discharge line 18*a*, respectively, and transferred to the second stage compression unit 10*b* in the multi-stage compression-type compressor 12.

In this case, the oxygen and nitrogen flowing respectively along the oxygen discharge line 18*b* and the nitrogen discharge line 18*a* may be controlled in the flow thereof or adjusted in the flow rate (concentration) thereof through the operation of the solenoid valves and flow meters 20*a* and 20*b* controlled by the controller 22.

Meanwhile, external air is selectively introduced even through the bypass pipe 19 and the sub-air line 17 and transferred to the second stage compression unit 10*b* in the multi-stage compression-type compressor 12, by the operation of the solenoid valve and flow meters 20*c* and 19*a* controlled by the controller 22.

Thereafter, the pressure of oxygen, nitrogen or the air, which is introduced into the second stage compression unit 10*b* in the multi-stage compression-type compressor 12 and adjusted in concentration thereof, is increased to 50 bar or more by two steps and then the oxygen, the nitrogen, or the air is transferred to the third stage compression unit 10*c* in the multi-stage compression-type compressor 12 through the discharge/suction line 13*b*.

Next, the pressure of the compressed air, that is, oxygen or nitrogen, which is introduced into the third stage compression unit 10*c* in the multi-stage compression-type compressor 12 and adjusted in concentration thereof, is increased to 60 bar or more, or to 120 bar, 200 bar, or 300 bar depending on the purpose of the user, by three steps and then the oxygen, the nitrogen, or the air, which is increased in pressure thereof by three steps, is finally supplied to the user or the use place through the discharge line 15.

In the process of making the flow of air which is to be finally discharged to the user or the use place after the air is introduced and pressure of the air is increased by one step to three steps, oil, moisture, and foreign matters are removed from the compressed air through the air cooling and purifying filter units 16*a*. 16*b*, and 16*c*, the condensate water separation units 26*a* and 26*b*, and the high-pressure air purification unit 27 provided on the lines. Accordingly, oxygen suitable for respiration and nitrogen suitable for the industrial use may be finally provided.

As described above, according to the present invention, the high-pressure compressor of a multi-stage compression type is utilized and various peripheral parts and lines including the oxygen and nitrogen separator are integrally mounted at the side of the compressor. Accordingly, a system is constructed, in which the system produces air for respirator including oxygen having the high concentration of 90 volume % from normal oxygen having the concentration of about 20 volume %, which is necessary for the user, and 100 volume % of nitrogen for an industrial purpose through one equipment by adjusting the concentration of oxygen or nitrogen, thereby implementing a product saving energy by utilizing one power, having integrated functions, and having the optimized scale.

In addition, according to the present invention, a specific amount of air remains in the breathing air tank when the air is discharged from the breathing air tank, thereby preventing dew from being concentrated as the air is infiltrated into the breathing air tank, so the corrosion of the tank is basically prevented. In addition, an alert related to the use of the tank is provided to the user, in advance, by monitoring the internal state of the breathing air tank. The convenience and the efficiency may be increased in the whole system operation related to the automatic charging and discharging of the air.

The invention claimed is:

1. A breathing air charger for detecting a tank state, comprising:
    a fine dust sensor (130) that is provided on an air discharge line (120) of a breathing air tank (110), which contains high-pressure air provided from a high-pressure air charger (100), to sense a concentration of fine dust contained in air discharged from the breathing air tank (110); and
    a controller (22) that compares a detection value of the concentration of the fine dust, which is input from the fine dust sensor (130), with a preset fine dust concentration reference value and outputs an alert signal when the detection value of the concentration of the fine dust is equal to or greater than the preset fine dust concentration reference value,
    wherein the high-pressure air charger (100) includes: a multi-stage compression-type compressor having a plurality of compression units connected with respective lines, in which external air introduced through a main air line is compressed in multiple stages while sequentially passing through the compression units, to compress air while being driven by one power;
    an oxygen/nitrogen separator that is provided on a discharge/suction line provided between a first stage compression unit and a second stage compression unit in the multi-stage compression-type compressor to separate oxygen and nitrogen, which is contained in the air, from each other in a membrane manner; and
    an air cooling and purifying filter unit that is provided on at least one line of each discharge/suction line connecting the compression units in the multi-stage compression-type compressor to each other and a discharge line of a final compression unit to cool and purify the air, to allow the oxygen and the nitrogen in the air to be separated from each other and the separated oxygen or nitrogen to be supplied to a user or a use place, and
    wherein the high-pressure air charger includes: the solenoid valves and flow meters that are provided on an oxygen discharge line and a nitrogen discharge line provided on the oxygen/nitrogen separator, and on a sub-air line connected to a discharge/suction line provided between the second-stage compression unit in the multi-stage compression-type compressor and the oxygen/nitrogen separator to control an amount of the air flowing the lines and flow of the air; and
    a controller that controls operations of the solenoid valves and flow meters to control concentration of the oxygen or the nitrogen.

2. The breathing air charger of claim 1, further comprising:
    an air pressure sensor (140) provided at one side of an air supply line (170) of the breathing air tank (110) to detect pressure of the air discharged from the breathing air tank (110); and an automatic switch valve (150) provided on the air discharge line (120) to control the flow of the air,
    wherein, when the air is discharged from the breathing air tank (110), the controller (22) compares an air pressure detection value, which is input from the air pressure sensor (140), with a preset air pressure reference value and controls the operation of the automatic switch valve (150) to be turned off to block the air from being discharged, when the air pressure detection value reaches the air pressure reference value.

3. The breathing air charger of claim 1, further comprising:
    a silencer (160) provided at an end portion of the air discharge line (120) of the breathing air tank (110) to attenuate noise generated when the air is discharged.

4. The breathing air charger of claim 2, wherein the air supply line (170) connected with the air discharge line (120) is connected between the high-pressure air charger (100) and the breathing air tank (110), and a check valve (180) is provided on the air supply line (170) to block the air from moving to the high-pressure air charger (100), and
    wherein a process of discharging the air from the breathing air tank (110) and a process of charging compressed air supplied from the high-pressure air charger (100) after discharging the air, are automatically and continuously performed under control of the controller (22).

5. The breathing air charger of claim 1, further comprising:
    a bypass pipe (10) interposed between the first stage compression unit (10a) and the second stage compression unit (10b) to compress and provide only air having 20 volume % of oxygen.

6. The breathing air charger of claim 1, further comprising:
    an oxygen/nitrogen concentration sensor provided on the discharge/suction line, which is connected to the second stage compression unit in the multi-stage compression-type compressor, to detect the concentrations of oxygen and nitrogen,
    wherein the controller controls operations of the solenoid valves and flow meters in response to a signal received from the oxygen/nitrogen concentration sensor.

7. The breathing air charger of claim 1, wherein the multi-stage compression-type compressor includes the first stage compression unit, the second compression unit, and a third stage compression unit, and
    wherein each of the first stage compression unit, the second compression unit, and the third stage compression unit includes a first stage piston, a second stage piston, and a third stage piston reciprocating while operating together with one output side.

8. The breathing air charger of claim 1, further comprising:
    a condensate water separation unit that is provided on at least one line of each discharge/suction line connecting the compression units in the multi-stage compression-type compressor to each other and the discharge line of the final compression unit to remove moisture from the air.

* * * * *